Inventor:
John C. Marinace,
by Howard S. Schlanker
His Attorney.

SEMICONDUCTOR DEVICES

Filed June 17, 1954 2 Sheets-Sheet 2

Inventor:
John C. Marinace,
by Howard J. Schlansker
His Attorney.

2,904,704
Patented Sept. 15, 1959

2,904,704

SEMICONDUCTOR DEVICES

John C. Marinace, Schenectady, N.Y., assignor to General Electric Company, a corporation of New York Application June 17, 1954, Serial No. 437,453

8 Claims. (Cl. 307—88.5)

Figure 1:
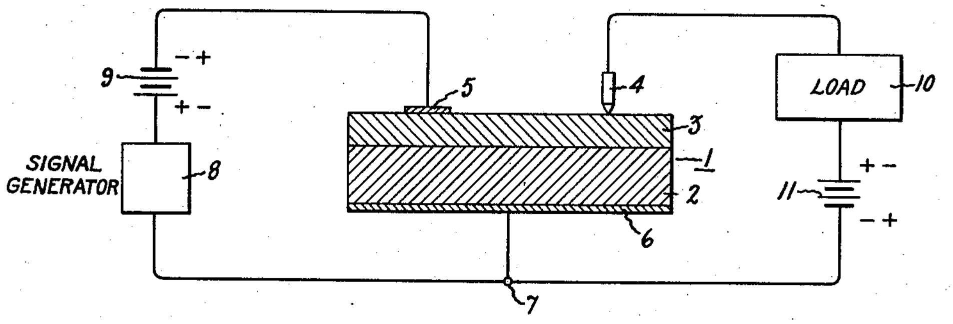

My invention relates to semiconductor electrical devices. More particularly it relates to semiconductor electrical devices of the type having two or more contacting zones of semiconductor material of different types of conductivity.

Semiconductors are normally classified as either positive (P-type) or negative (N-type) depending primarily on the type and sign of their main electrical conduction carriers. In P-type semiconductors the conduction carriers are electron vacancies or holes produced by the movement of electrons in the valence band, whereas in N-type semiconductors the conduction carriers are electrons moving in the conduction band. The direction of rectification as well as the polarity of various voltage effects is different in semiconductors of the two types.

Whether a particular semiconductor is of the P-type or the N-type depends primarily on the type of impurity present in the material. For example, in germanium and silicon, some impurities called "donors" such as antimony, phosphorus, arsenic, furnish free additional electrons to the semiconductor and produce an N-type material. Other impurities called "acceptors" such as aluminum, gallium, indium, and zinc tend to absorb electrons, leaving electron vacancies or holes in the material to produce a so-called P-type semiconductor. Only very small amounts of these impurities are required to produce marked electrical effects of one type or the other.

An object of my invention is to provide a new type of semiconductor electrical device.

Another object of my invention is to provide semiconductor devices having characteristics different from those of known devices.

Another object of my invention is to provide semiconductor devices having improved performance during high frequency operation and improved frequency response.

A further object of my invention is to provide such devices which are easily fabricated.

Briefly stated, my invention comprises semiconductor devices wherein at least two rectifying barriers are in sufficiently close proximity each to the other that an electrical signal applied to one barrier will change the conductive character of the other barrier without depending upon the flow of minority charge carriers from one barrier to the other. It will be understood that either electrons or holes can be minority charge-carriers, depending upon the region in which they are present. For example, electrons which may be present in a P-type semiconductor material are termed minority charge carriers, as are holes which may be present in an N-type semiconductor material.

My invention comprises generally a semiconductor device having a body of one type conductivity having on one face or surface thereof a thin layer of material of opposite type conductivity. In contact with this layer are two electrodes, at least one of which is rectifying relative to said layer. A third electrode is fixed to the body of the device.

The features of my invention which I believe to be novel are set forth with particularity in the appended claims. My invention itself, however, both as to its organization and method of operation, together with further objects and advantages thereof may best be understood by reference to the following description taken in connection with the drawings in which Fig. 1 shows an embodiment of my invention, Fig. 2 shows a typical performance characteristic of my invention, and Figs. 3 through 8 show further embodiments of my invention.

It will be understood that while for ease of description I set forth my invention with respect to certain materials or types of materials, other equivalent materials and types of materials may be used and these will occur to those skilled in the art.

Figure 2:
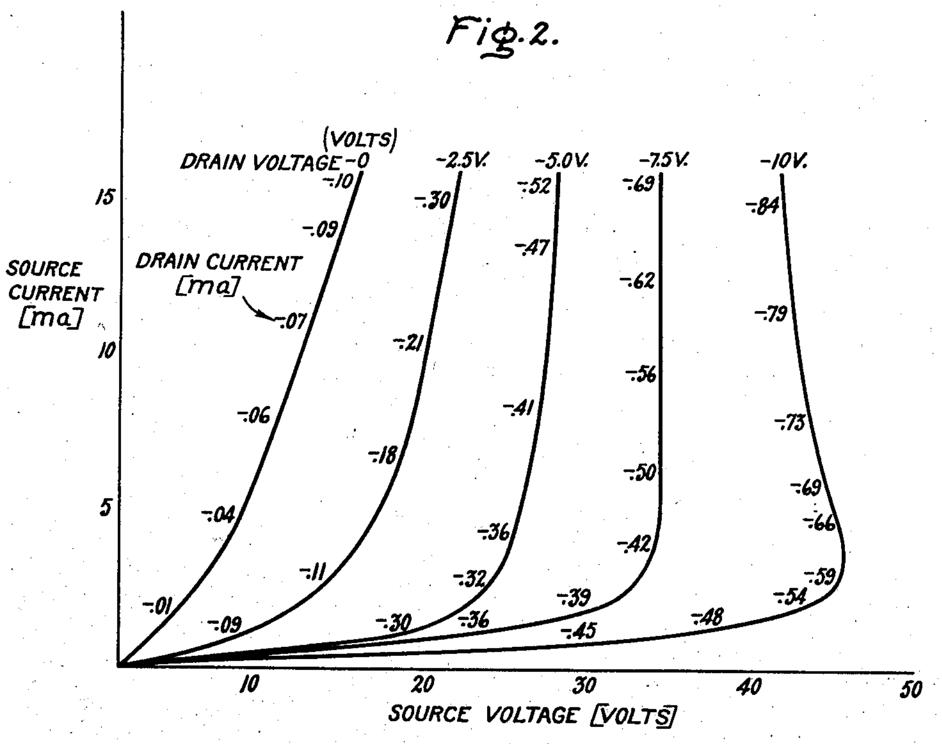

Referring to Fig. 1 there is shown a typical semiconductor device 1 of my invention having a body 2 of one type conductivity, for example, N-type and a thin layer 3 on one face thereof having an opposite type conductivity, in this particular case P-type. Body 2 may be of any suitable material such as N-type germanium or silicon and the like which has placed on its surface a coating or layer of opposite or P-type material as by vacuum deposition or by other means well-known to those skilled in the art. Iron pyrite may also be used as the body material. It has been found that iron pyrite as prepared or found in nature is mainly N-type but may have surface areas or layers of P-type material thereon. The same has been found true of prepared germanium ingots and is probably true for other materials as well. To recapitulate then, body 2 may be of any material such as N-type germanium, silicon, iron pyrite and the like, which has on its surface a thin P-type layer 3, either prepared or naturally occurring. It will be appreciated, of course, that the type conductivity materials in the body and layer may be reversed.

Body 2 may be in the form of a block, strip, or wafer as desired. A block approximately 0.3 cm. long, 0.3 cm. wide, and 0.1 cm. thick has been found convenient, although these dimensions are not critical and may be varied widely. The thickness of layer 3 may be varied widely also, but particularly in the source 4 region a thickness of the order of one micron is preferable. However, the optimum thickness of the layer in the region specified depends in part on the conductivities of the layer and body, with the lower conductivity layers allowing a greater thickness. The layer thickness in iron pyrite may be over ten microns. Purposeful variations in the thickness of layer 3 produce changes in the translating characteristics of the device. It is advantageous also that the nature of the surface layer be such that the diffusion length of minority charge carriers is short for reasons which will be explained hereinafter.

In Fig. 1 source electrode 4 is of the whisker or rectifying type and may be of the usual metals employed for such electrodes, for example, a pointed copper, Phosphor-bronze, molybdenum, or platinum wire about 0.004 inch in diameter. Drain electrode 5 is of the ohmic type and may be conveniently formed by spraying or vacuum depositing a metal such as tin or lead on layer 3 in the region desired. Alternatively, electrode 5 may be formed by applying silver paint to the area; such silver paints are well-known to those skilled in the art and usually comprise silver powder suspended in a resinous substance and a solvent. Such a sprayed, painted, or vacuum deposited electrode is of the type which tends to inject a minimum or few, if any, minority charge carriers into the surface layer 3. Normally a surface layer which has been vacuum deposited also tends to prevent the flow of minority charge carriers. Melting and quick freezing of the layer 3 also discourages such flow as do other disturbances of the surface produced as by grinding, for example. The distance between electrodes 4 and 5 is preferably small or less than about 0.005 inch to give best results. Gate electrode 6 on the lower surface of body 2 is of the ohmic type and has a relatively large area. It is shown as covering the entire lower surface of body 2, although the contact area may be less extensive. Electrode 6 may be of any usual solder having a melting point less than that of body 2, for example, a tin-lead solder. A solder which is doped with a material which will enhance the type conductivity of body 2 may be used. For example, for an N-type germanium or silicon body a solder doped with antimony, phosphorus, or arsenic may be used. For a P-type body a solder doped with aluminum, gallium, indium, or zinc may be employed.

In the circuit shown in Fig. 1, gate 6 is connected through common connection or ground 7 to drain 5 through input signal source 8 which may be of the usual type, and D.C. source 9, the latter serving to bias drain 5 at an appropriate potential which is usually negative, although in some cases positive, to the gate 6. The output circuit comprises in series connection between gate 6 and source 4 an impedance load 10 and D.C. source 11 which serves to bias the source 4 at a potential which is usually positive but may be negative relative to the gate 6. In a typical circuit using iron pyrite in the semiconductor device 1, the drain bias supplied by source 9 may be about 5 volts negative and the source bias supplied by source 11 about 25 volts positive relative to the gate 6. The load may typically be about 2500 ohms. Amplified reproductions of input signals impressed by signal source 8 are produced at load 10.

I do not wish to be bound by any particular theory which may be used to explain the operation of my invention, it being sufficient that an actual advance in the art has been made. However, to the best of my present knowledge, I believe that when the usual positive potential is impressed upon source electrode 4 the current which flows is actually a "reverse" current through a rectifying contact since source electrode 4 rectifies relative to layer 3. Most of this current, I believe, flows across a P–N junction formed by layer 3 and body 2 and on to the common connection or ground 7. When, however, a negative potential is impressed upon drain 5 the depletion or space-charge layer of the P–N junction, which is of high resistance, widens in a vertical sence in the figures shown. This widening effect is believed to be greatest directly under the drain 5 but it may extend to other parts of the P–N junction. As the depletion layer of the junction widens, the flow lines of current from source electrode 4 are constrained more and more to near the free or upper surface of the P-type layer 3, and the source-to-gate resistance is thereby increased. This much of the mechanism as described above is quite similar to the action of the so-called unipolar transistor. However, there is in the unipolar transistor no rectifying barrier close to the P–N junction as is provided by the source electrode 4 in the device of my invention. It is believed to be this rectifying barrier in which my device distinguishes over the prior art.

Since the device of my invention functions through an increase in resistance of source electrode 4 as a negative potential is impressed upon the drain 5, care must be taken to suppress any action which may decrease the source resistance during this period. For example, if minority charge carriers (electrons in the illustrated cases) are injected from the drain 5 and added to the majority charge carriers (holes in the illustrated case) in the P-type layer 3 near source electrode 4, the source resistance thereby would tend to be decreased. To avoid this effect, several steps may be taken. First, the source electrode 4 may be positioned from the drain 5 at a distance which is greater than the distance over which the minority charge carriers will ordinarily diffuse. If the layer 3 is such that it will allow minority charge carriers to diffuse a considerable distance, the widening of the P–N junction at this or greater distances will be considerably less than it is nearer the drain, and optimum performance will be sacrificed.

The use of a semiconducting material which has a short diffusion length for minority charge carriers has particular advantages when used in the surface layer over materials which have longer diffusion lengths. Not only can drain-source spacing be reduced, but such a surface layer causes the conduction characteristic of the source electrode to assume a highly useful form which can be matched to a low resistance load, as will be seen by reference to Fig. 2. Typical semiconductor materials which have this property of short diffusion length for minority charge carriers are iron pyrite, cadmium sulfide, cadmium selenide, selenium and certain types of germanium and silicon which do not possess a high degree of crystal perfection. It is possible to match the source conduction characteristic to higher resistance loads by causing the surface layer in the region of the source electrode to have the property of long diffusion-length and causing the surface layer in the region of the drain electrode to have the property of short diffusion-length. Aside from using two distinct materials to form an integral surface layer, there are means for altering a long-diffusion length material to a short-diffusion length material. Typical of these means which would apply in this invention are abrading of the surface of the layer near the drain electrode, or melting and quickly freezing the layer in the region where the drain electrode will be located.

Secondly, the drain itself may be of a material which will not inject minority charge carriers into layer 3. As pointed out above, drains made from metallic paint or from sprayed metal or from vacuum deposited metal inject very few, if any, minority charge carriers unless they be given subsequently a special treatment, such as etching. Preferably such drains are used in conjunction with the special layer or special regions of the layer, mentioned above.

Thirdly, the configuration of the surface layer may be such that it is thin at the source electrode but relatively thick at the drain to prevent minority charge carriers from traveling to the source.

The transition region of the junction between the P-type layer and N-type body may be either abrupt or gradual, as mentioned earlier, and the nature of the transition region has a decided effect upon the characteristics of the device. If the change between zones is abrupt, a relatively large input signal voltage must be used to effect an appreciable decrease in the source conductivity. As the transition region becomes more gradual the threshold voltage lowers; in extreme cases of the gradual character, the portion of the device between the P and N zones or layers may be of the intrinsic conductivity type.

Referring to Fig. 2 there is shown a plot of the static output characteristic of a typical device as shown in Fig. 1 using iron pyrite as the semiconducting material. Similar results are obtained, using germanium or silicon as the body material.

Figure 3:
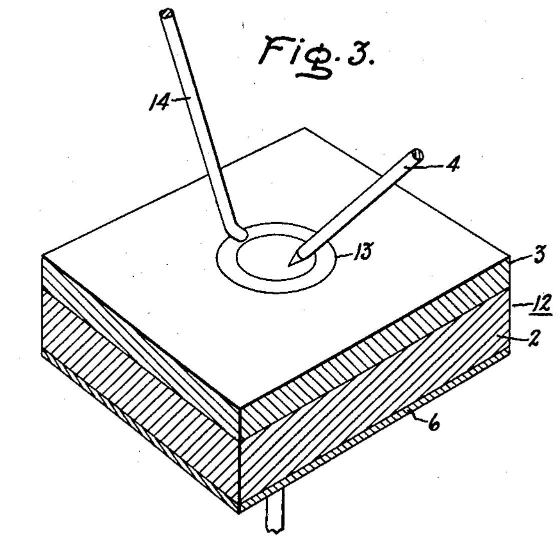

Shown in Fig. 3 is an embodiment of my invention which, as in all other embodiments, may be employed similarly to that of Fig. 1. In this device 12 we have as in the embodiment of Fig. 1 a body 2 of one type conductivity and a layer 3 of opposite type conductivity material, again of the order of one micron thick in the source region. Drain 13 here is in the shape of a ring of metal such as is provided by painting the surface with a metal paint or selectively spraying or vacuum depositing the metal thereon. Connecting wire 14 is fixed to the drain forming a broad area ohmic contact therewith. The source 4 is similar to that shown in Fig. 1 and is positioned with respect to the drain and gate 6 as in the first embodiment. This configuration produces large amplification of input signals.

Figure 4:
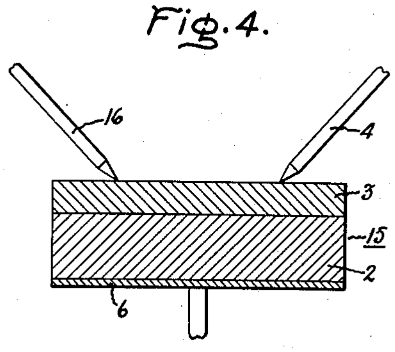

Referring to Fig. 4, there is illustrated another embodiment 15 in which the body 2 and layer 3 as well as gate 6 and source 4 are similar to those above. However, here the drain electrode 16 is also of the point contact type, which, as in the case of source 4 also rectifies relative to layer 3. Although some signal power may be dissipated in the spreading resistance of the drain, this device is useful in applications such as in high frequency work made possible by the relatively lower capacitance of the point-contact or rectifying drain.

Figure 5:
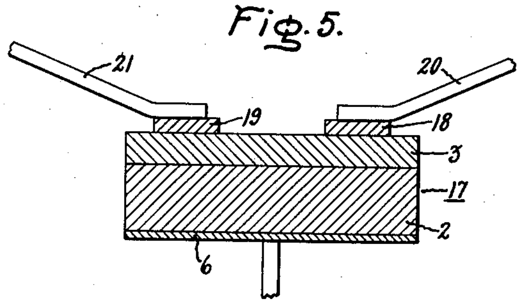

Fig. 5 sets forth an embodiment 17 of my invention in which both source and drain are of the broad area type. Here the body 2, layer 3, and gate 6 are similar to those of the above described embodiments. However, drain 19 shown with its lead 21 is of the broad area ohmic type, whereas source 18, having lead 20, is made of a metal or alloy which will cause the source to rectify relative to layer 3.

Figure 6:
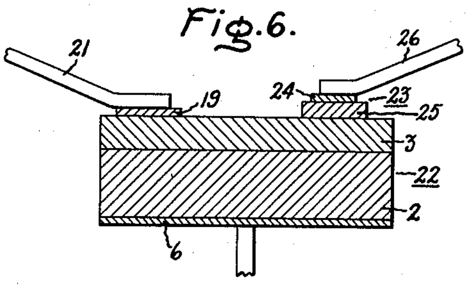

Another embodiment 22 of my invention shown in Fig. 6 has a body 2, layer 3, and gate 6, similar to those of the preceding described devices. Drain 19 and its lead 21 are the same as those of Fig. 5, the drain 19 being of the broad area ohmic type. Source electrode 23 is a composite electrode comprising an upper electrode 24 which is similar to those broad area contacts described above, being conveniently of a metal paint. The base part or sub-electrode 25 of the source 23 is made of a type material having a conductivity opposite to that of layer 3. For instance, if layer 3 is of the P-type conductivity sub-electrode 25 is of N-type material. Source 23, shown with its connecting lead 26 is rectifying relative to layer 3, as in the case of the point contacts 4 discussed above.

Referring again to Fig. 4, it may be seen that the point rectifying contacts 4 and 16 shown therein may be replaced by broad area electrodes which rectify relative to the layer. In other words, such electrodes may have the structure of electrode 18 of Fig. 5 or electrode 23 of Fig. 6, or combinations of these.

Figure 7:
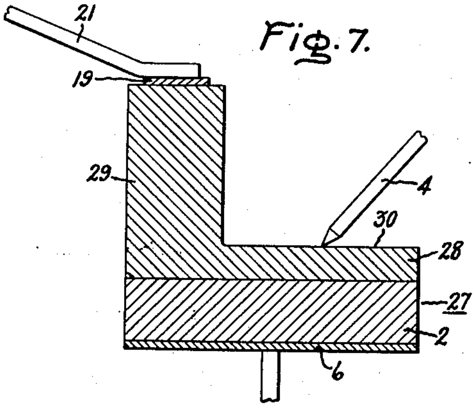

In Fig. 7 is shown still another embodiment 28 of my invention in which body 2, source 4, gate 6, and drain 19, along with its lead 21, are as shown heretofore. However, layer 28 is decidedly non-uniform in thickness, having a relatively thick portion 29 under drain 19 and a relatively thin portion 30 under source 4. Layer portion 30 is typically of the order of one micron thick in the region of source 4, whereas portion 29 thereof is relatively much thicker, say of the order of 100 or 150 microns to insure that minority charge carriers do not reach source 4. The configuration of layer 28 may be varied as will be evident so long as the portion under the drain is thick relative to that under the source as set forth above.

In the embodiments of my invention shown in Fig. 1 and Figs. 3 through 7, the relative conductivities of the body 2 and layer 3 greatly effect the amplification obtained. It is well-known to those skilled in the art that when the depletion layer of a P–N junction is widened by means of a reverse potential applied to the junction, the extent of widening is greater toward the zone of lower conductivity. Therefore, different amplification characteristics will be obtained in such devices for different relative values of conductivity as between zones of different type conductivity. Usually the greatest amplification is obtained when the conductivity of the N-type body, for example, is greater than that of a P-type layer.

Figure 8:
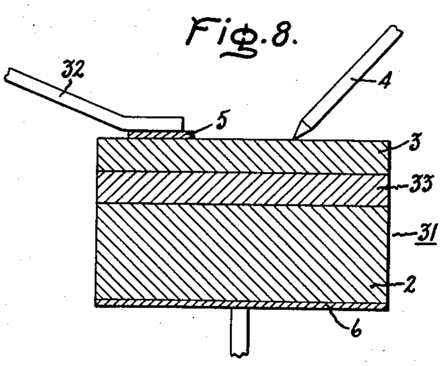

Referring now to Fig. 8, device 31 has a body portion 2, layer 3, source 4, and gate 6 similar to that of Fig. 1. Drain 5 to which lead 32 is attached is also similar. However, between body 2 and layer 3 there is a layer or zone of intrinsic (I-type) semiconductor material wherein the number of charge-carriers, electrons, or holes, normally present is small compared to the number present in N-type or P-type materials. Besides affording desirable amplification at ordinary frequencies, this configuration is especially suitable for high frequency operation inasmuch as the capacitance of P–I–N junction is lower than that of a comparable P–N junction.

As pointed out hereinbefore, while I have specified a structure of N-type material and an associated part of P-type material, the type conductivity of each part may be respectively reversed. Also, where I have specified certain materials such as iron pyrite, germanium, or silicon, it will be realized that other materials of the same conductivity characteristic may be used. Likewise materials doped to produce a particular type conductivity material may be utilized, as in germanium ingots produced in such a manner to yield alternate layers of P and N-type material. For example, P-type germanium may be used in an N-type iron pyrite or silicon body.

While I have described this invention in connection with certain specific embodiments and examples, I wish it to be understood that I desire to protect in the following claims all variations of my invention which do not depart from the spirit or scope thereof.

What I claim as new and desire to secure by Letters Patent of the United States is:

1. A semiconductor electrical device consisting of a body of one type conductivity material, a layer of material of opposite type conductivity on one surface of said body, two spaced electrodes in contact with said layer, one of said electrodes having a rectifying action relative to said layer and the other of said electrodes making ohmic contact with said layer and a third electrode in ohmic contact with said body.

2. A semiconductor electrical device consisting of a body of material having one type conductivity, a layer of material of opposite type conductivity on one surface of said body forming a junction with said body, said layer being substantially one micron thick, two spaced electrodes on said layer, one of said electrodes having a rectifying action with respect to said layer and the other of said electrodes making ohmic contact with said layer and an electrode in ohmic contact with said body.

3. A semiconductor electrical device consisting of a body of one type conductivity, a layer of material of opposite type conductivity on one surface of said body, two spaced electrodes in contact with said layer, one of said electrodes having rectifying action relative to said layer and the other of said electrodes being in ohmic contact with said layer, and an electrode in ohmic contact with said body, said layer being of non-uniform thickness and being relatively thinner at said rectifying electrode.

4. A semiconductor electrical device comprising a body of one type conductivity material, a layer of material of opposite type conductivity on one surface of said body and forming a junction with said body, two spaced electrodes in contact with said layer, one of said electrodes being in rectifying contact relative to said layer and the other of said electrodes being in ohmic contact relative to said layer, a third electrode in ohmic contact with said body, a load and a source of electromotive force being connected in series circuit between said rectifying electrode and said third electrode, said source polarizing said rectifying elctrode in the reverse direction with respect to said layer, a signal source and a second source of electromotive force connected in series circuit between the other of said spaced electrodes and said third electrode, said source polarizing said junction in the reverse direction.

5. A semiconductor electrical device comprising a body of one type conductivity semiconductor material and a layer of semiconductor materials of the opposite type conductivity on one surface of said body, a first and second electrode in contact with said layer and spaced with respect to one another, the first of said electrodes being in point contact rectifying relationship with respect to said layer and the second of said electrodes surrounding said first electrode and in ohmic contact with said layer, and a third electrode in ohmic contact with said body.

6. A semiconductor electrical device comprising a body of one type conductivity material, a layer of material of opposite type conductivity on one surface of said body forming a rectifying junction with said body, two spaced electrodes in contact with said layer, one of said electrodes having a rectifying action relative to said layer and the other of said electrodes being in ohmic contact with said layer, a third electrode in ohmic contact with said body, means for applying a bias voltage between said one electrode and said third electrode to bias said one electrode in the reverse direction with respect to said layer and to bias said layer conductive with respect to said body, means for applying a bias voltage between said third electrode and said other electrodes to bias said junction in the reverse direction, and means for applying a signal in circuit between said other electrode and said third electrode.

7. A semiconductor electrical device consisting of a body of one type conductivity material, a layer of material of opposite type conductivity on one surface of said body, two spaced electrodes in contact with said layer, one of said electrodes being of the point contact type and having a rectifying action relative to said layer and the other of said electrodes making ohmic contact to said layer, and a third electrode in ohmic contact with said body.

8. A semiconductor device consisting of a body of one type conductivity material, a layer of material of opposite conductivity on one surface of said body, two spaced electrodes of the broad area type in contact with said layer, one of said electrodes having a rectifying action relative to said layer and the other of said electrodes making ohmic contact with said layer, and a third electrode in ohmic contact with said body.

References Cited in the file of this patent

UNITED STATES PATENTS

| | | |
|---|---|---|
| 933,263 | Pickard | Sept. 7, 1909 |
| 2,476,323 | Rack | July 19, 1949 |
| 2,486,776 | Barney | Nov. 1, 1949 |
| 2,524,033 | Bardeen | Oct. 3, 1950 |
| 2,524,035 | Bardeen | Oct. 3, 1950 |
| 2,560,594 | Pearson | July 17, 1951 |
| 2,609,428 | Law | Sept. 2, 1952 |
| 2,629,802 | Pantchechnikoff | Feb. 24, 1953 |
| 2,646,609 | Heins | July 28, 1953 |
| 2,666,814 | Shockley | Jan. 19, 1954 |
| 2,795,744 | Kircher | June 11, 1957 |